(12) United States Patent
Miyagawa et al.

(10) Patent No.: US 6,688,724 B2
(45) Date of Patent: Feb. 10, 2004

(54) IMAGE FORMING DEVICE AND IMAGE FORMING METHOD

(75) Inventors: Ichirou Miyagawa, Kanagawa (JP); Takao Ozaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/236,949

(22) Filed: Sep. 9, 2002

(65) Prior Publication Data

US 2003/0090560 A1 May 15, 2003

(30) Foreign Application Priority Data

Sep. 14, 2001 (JP) .......................... 2001-279217

(51) Int. Cl.[7] .............................. B41J 23/00; B41J 2/385
(52) U.S. Cl. ......................... 347/38; 347/169; 347/134
(58) Field of Search ........................ 347/38, 134, 169

(56) References Cited

U.S. PATENT DOCUMENTS

| 5,668,588 A | 9/1997 | Morizumi et al. |
| 6,016,752 A | 1/2000 | Harari |
| 6,404,708 B1 * | 6/2002 | Lee .......................... 369/36.01 |

FOREIGN PATENT DOCUMENTS

| EP | 0 918 255 A2 | 5/1999 |
| EP | 0 967 782 A1 | 12/1999 |
| JP | 2000-043318 | 2/2000 |

OTHER PUBLICATIONS

Japanese Abstract No. 2000043318, dated Feb. 15, 2000.

* cited by examiner

*Primary Examiner*—Thinh Nguyen
(74) *Attorney, Agent, or Firm*—Sughrue Mion, PLLC (57) ABSTRACT

An image forming device capable of implementing a change of resolution and capable of forming an image with few linear flaws in a main scanning direction. A recording material is slantedly wound onto a rotary drum at an angle such that, if recording at a predetermined resolution, main scanning lines that are recorded are parallel with both ends of the recording material along a direction of winding onto the drum. Whenever a main scanning line being recorded on the recording material is displaced, relative to a main scanning line that would be recorded at the predetermined resolution, by precisely an amount corresponding to a pre-specified number of pixels, image data is shifted in a direction opposite to the direction of the displacement by the amount corresponding to the pre-specified number of pixels.

8 Claims, 11 Drawing Sheets

IMAGE FORMING DEVICE AND IMAGE FORMING METHOD

BACKGROUND OF THE INVENTION

1. Field of the Invention

The present invention relates to an image forming device and an image forming method, and more particularly to an image forming device and an image forming method with which image formation is carried out in accordance with a specified resolution by irradiating a recording medium, which is wound on a peripheral surface of a cylindrical drum, with a plurality of light beams along a sub-scanning direction parallel to a rotation axis of the drum.

2. Description of the Related Art

Figure 11:
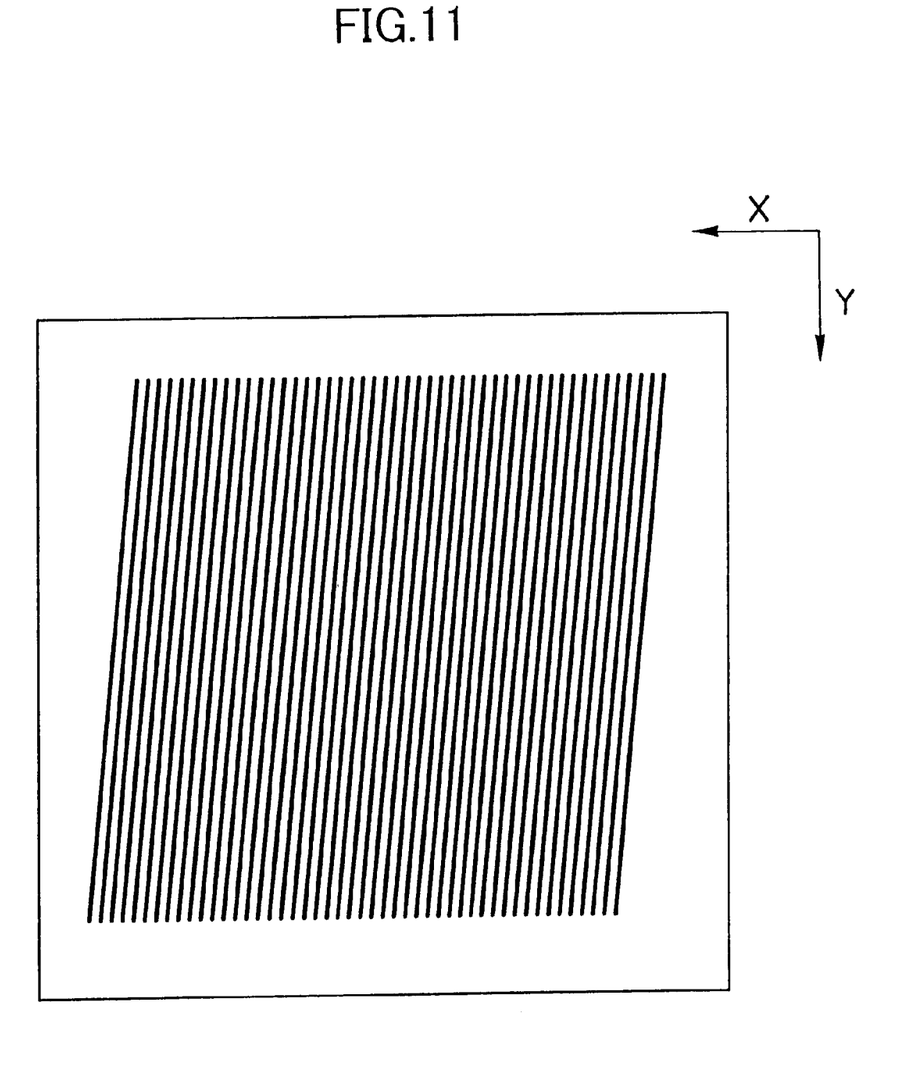
FIG. 11 is an image formation example in which normalization compensation processing has not been performed.

Conventionally, image forming devices have been utilized in which an image is recorded on a recording medium, which is wound on a peripheral surface of a cylindrical drum, using a number n of light beams, which are disposed to be separated by predetermined intervals along a sub-scanning direction. In such an image forming device, the drum rotates oppositely to a main scanning direction, and an optical head for irradiating the light beams moves along the sub-scanning direction. The optical head forms the image by moving in the sub-scanning direction only by a distance corresponding to the length of an image that is formed by the light beams during one rotation of the drum. Accordingly, the optical head proceeds to form a two-dimensional image in a spiral (helical) form. Consequently, as the image is formed in the spiral form, a problem arises in that the formed image is distorted to a parallelogram shape, as shown in FIG. 11.

Therefore, in order to eliminate the distortion described above, there is a method for forming images in which the recording medium is preparatorily inclined and wrapped on the drum at an angle in accordance with the number of light beams and the resolution.

Further, a multi-beam rendering method has been disclosed in Japanese Patent Application Laid-Open (JP-A) No. 2000-43318. This disclosure proposes a method for recording in which, during recording of one line in the main scanning direction, recording pixel is shifted by a maximum of n in a direction opposite to a moving direction of the optical head.

However, in the method in which the recording material is inclined beforehand and fixed to the drum in accordance with the number of light beams and the resolution, the inclination cannot be changed in accordance with a change in resolution. Therefore, there is a problem in that the resolution is fixed and image forming cannot proceed in accordance with another resolution.

Further, in the multi-beam rendering method disclosed in JP-A 2000-43318, because the image is formed by moving it in the sub-scanning direction precisely by a distance corresponding to a sub-scanning direction length of image formed by the light beam, as the number of light beams increases, the number of times the recording pixels are shifted increases. Thus, there is a problem in that linear flaws in the main scanning direction occur and image quality deteriorates.

SUMMARY OF THE INVENTION

The present invention is provided to solve the above-described problems and an object of the present invention is to provide an image forming device and an image forming method respectively capable of implementing a change of resolution and capable of forming an image with few linear flaws in a main scanning direction.

In order to solve the problems described above, an image forming device of a first aspect of the invention is an image forming device for forming an image in accordance with an inputted resolution by irradiating a recording material, the image forming device comprising: a rotary drum including a peripheral surface, the rotary drum rotating in a main scanning direction in a state in which the recording material is wound onto the peripheral surface; a recording head disposed at a portion facing the peripheral surface of the rotary drum, the recording head being moveable in an axial direction of the rotary drum, which is a sub-scanning direction, the recording head being capable of irradiating with a plurality of light beams which are separated by predetermined intervals in the sub-scanning direction, and the recording head irradiating the recording material with the light beams on the basis of image data while the rotary drum is rotating; and an image data-shifting section which shifts image data, wherein the recording material is wound onto the rotary drum in an incline manner such that, in a case of recording at a predetermined resolution, a main scanning line to be recorded is parallel to an end portion of the recording material which is along a direction of winding onto the rotary drum, and in a case of recording at the inputted resolution other than the predetermined resolution, the image data-shifting section, at each occurrence of displacement of a main scanning line being recorded at the recording material, relative to a main scanning line recorded at the predetermined resolution, by a predetermined pixel amount determined in advance, shifts image data by the predetermined pixel amount in a direction opposite to the direction of the displacement.

Further, an image forming method of a second aspect of the invention is a method for forming an image with an image forming device in accordance with an inputted resolution by irradiating a recording material, the image forming device comprising a rotary drum including a peripheral surface, the rotary drum rotating in a main scanning direction in a state in which the recording material is wound onto the peripheral surface, and a recording head disposed at a portion facing the peripheral surface of the rotary drum, the recording head being moveable in an axial direction of the rotary drum, which is a sub-scanning direction, the recording head being capable of irradiating with a plurality of light beams which are separated by predetermined intervals in the sub-scanning direction, and the recording head irradiating the recording material with the light beams on the basis of image data while the rotary drum is rotating, the method comprising the steps of: winding the recording material onto the rotary drum in an incline manner such that, in a case of recording at a predetermined resolution, a main scanning line to be recorded is parallel to an end portion of the recording material which is along a direction of winding onto the rotary drum, and in a case of recording at the inputted resolution other than the predetermined resolution, at each occurrence of displacement of a main scanning line being recorded at the recording material, relative to a main scanning line recorded at the predetermined resolution, by a predetermined pixel amount determined in advance, shifting image data by the predetermined pixel amount in a direction opposite to the direction of the displacement.

According to the first and second aspects of the invention, the rotary drum and the recording head are provided. The rotary drum rotates in the main scanning direction with the recording material wound at the peripheral surface. The recording head is disposed at a portion facing the peripheral surface of the rotary drum, is capable of emitting the plurality of light beams, and is moveable in the sub-scanning direction, which is the axial direction of the rotary drum. The light beams are separated by predetermined intervals along the sub-scanning direction. While the drum rotates, the light beams are irradiated at the recording medium from the recording head on the basis of the image data. Thus, an image is formed in accordance with the inputted resolution. When an image is formed in this way, the image is formed in a helical form. Therefore, main-scanning lines are formed with displacement in the sub-scanning direction, and are inclined with respect to the recording medium to a certain extent (see FIG. 11).

Therefore, in the first and second aspects of the invention, the recording material is slantedly wound such that, if an image is recorded at the predetermined resolution, the main scanning lines to be recorded are parallel with both ends (edges) of the recording material along the direction of winding onto the drum. In addition, for each occasion on which a main scanning line being recorded on the recording material is displaced, relative to the main scanning line that would be recorded at the predetermined resolution, by an amount corresponding to a predetermined number of pixels which is set in advance, image data is shifted the amount corresponding to the predetermined number of pixels in the direction opposite to the direction of displacement. Consequently, because the image is formed with the recording material being wound onto the rotary drum at an angle and the image data being shifted the amount corresponding to the predetermined number of pixels in the direction opposite to the direction of displacement whenever the main scanning lines being recorded on the recording material are displaced relative to the main scanning lines that would be recorded at the predetermined resolution by the amount corresponding to the predetermined number of pixels, the number of times data is shifted can be made smaller than in a case in which data is compensated by shifting but the recording material is wound on the drum non-inclinedly, and higher quality images can be formed. Further, because the number of times the data is shifted can be made smaller, loading on the device can be alleviated.

Moreover, with compensation by merely winding a recording material at an angle in accordance with a predetermined resolution, the resolution for which compensation is possible would be fixed. However, because in the present invention compensation is performed also by data shifting, compensation can be implemented in accordance with a change in resolution.

For judging displacement of the amount corresponding to the predetermined number of pixels, a one-line length in the main scanning direction is calculated from the predetermined resolution, the inputted resolution, the number of light beams, and a circumferential length of the rotary drum. It can be determined where there is displacement of the amount corresponding to the predetermined number of pixels by recording the calculated main scanning direction one-line length.

Furthermore, in the first and second aspects of the present invention, the predetermined resolution may be set to a minimum specifiable resolution, and the recording material wound onto the rotary drum at an angle in accordance with this minimum resolution. Because pixel intervals at low resolutions are wider than at high resolutions, steps caused by image data shifts when forming an image at low resolution will be larger and will cause image quality to deteriorate. Accordingly, the recording material is wound on the drum at the angle corresponding to the minimum resolution, at which the steps are largest, and compensation is performed by data shifts. Thus, the number of data shifts at low resolutions, at which the steps are more obvious, can be reduced. The number of shifts increases as the resolution gets higher. At higher resolutions, the steps are less obvious. Consequently, images of higher image quality can be formed.

Furthermore, in the first and second aspects of the present invention, a number of times of shifting of image data and a data length in the main scanning direction of the shifted image data in one main scanning are determined on the basis of the predetermined resolution, the inputted resolution, the number of the light beams, and a circumferential length of the rotary drum.

DESCRIPTION OF THE PREFERRED EMBODIMENTS

First Embodiment

Now, an image forming device and image forming method relating to the present invention will be described in detail with reference to the drawings.

Figure 1:
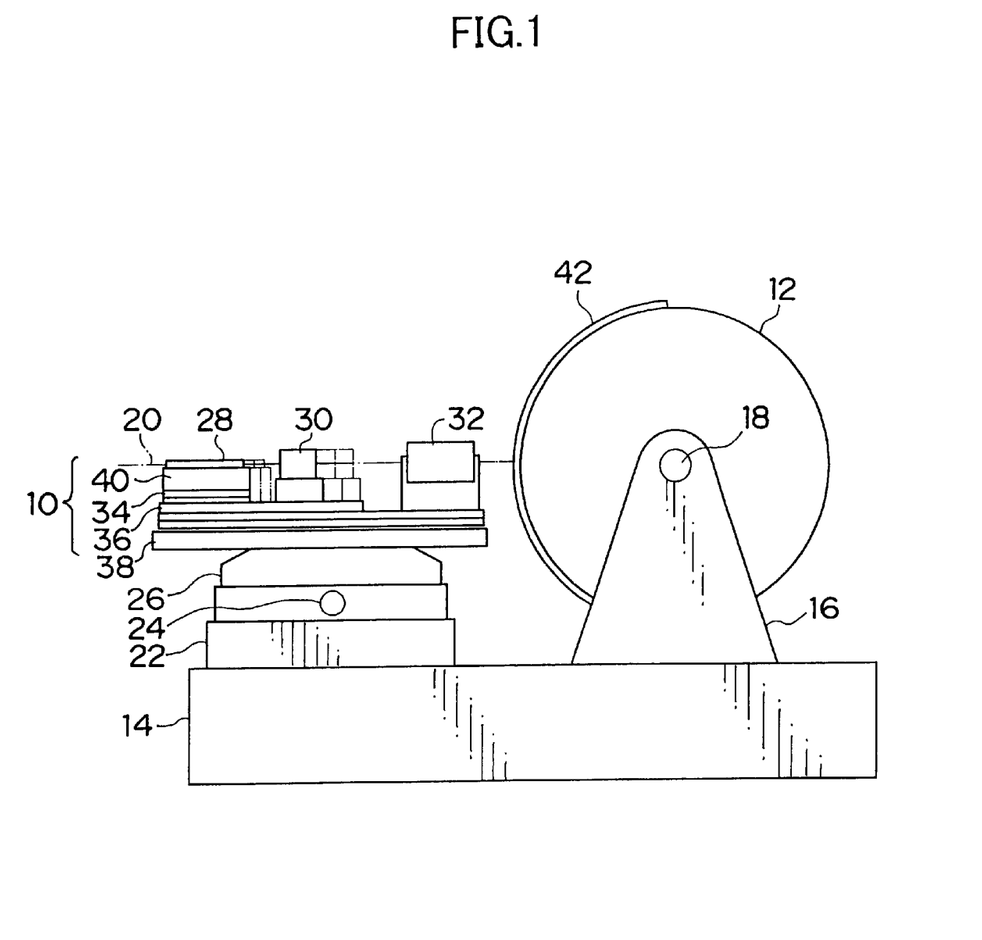
FIG. 1 is a schematic structural diagram of an image forming device of a present embodiment.

As shown in FIG. 1, structure of the image forming device relating to the present invention includes an exposure section 10, a rail 22 and ball screw 24 disposed downward of the exposure section 10 and enabling movement of the exposure section 10, a drum 12, and a support portion 16 and drum shaft 18 supporting the drum 12.

The support portion 16 is disposed on a base 14. The drum 12 is disposed to be rotatable about the drum shaft 18, which is attached at the support portion 16. The rail 22 below the exposure section 10 is disposed on the base 14 so as to be parallel with the rotation axis of the drum 12. The ball screw 24 is disposed on the rail 22. A mounting pedestal 26, for mounting the exposure section 10, is disposed above the ball screw 24. The exposure section 10 is mounted above the mounting pedestal 26. The exposure section 10 is moveable parallel to the rotation axis direction of the drum 12, by rotation of the ball screw 24.

The exposure section 10 is structured with an optical fiber array 28, a collimator lens 30, a condensing lens 32, and rails 34, 36 and 38. The optical fiber array 28, the collimator lens 30 and the condensing lens 32 are disposed on an optical axis 20 in this order from an upstream side of the optical axis 20. Light along the optical axis 20 is orthogonally incident at a side surface of the drum 12. The optical fiber array 28 is disposed on a base 40. The base 40 is disposed on the rail 34. A separation between the optical fiber array 28 and the collimator lens 30 is adjustable by movement on the rail 34. The rail 34 and the collimator lens 30 are disposed on a rail 36. A separation of the optical fiber array 28 and the collimator lens 30 from the condensing lens 32 is adjustable by movement on the rail 36. The rail 36 and the condensing lens 32 are disposed on the rail 38. A separation of the optical fiber array 28, the collimator lens 30 and the condensing lens 32 from the drum 12 is adjustable by movement on the rail 38. The rail 38 is disposed on the mounting pedestal 26.

Figure 2:
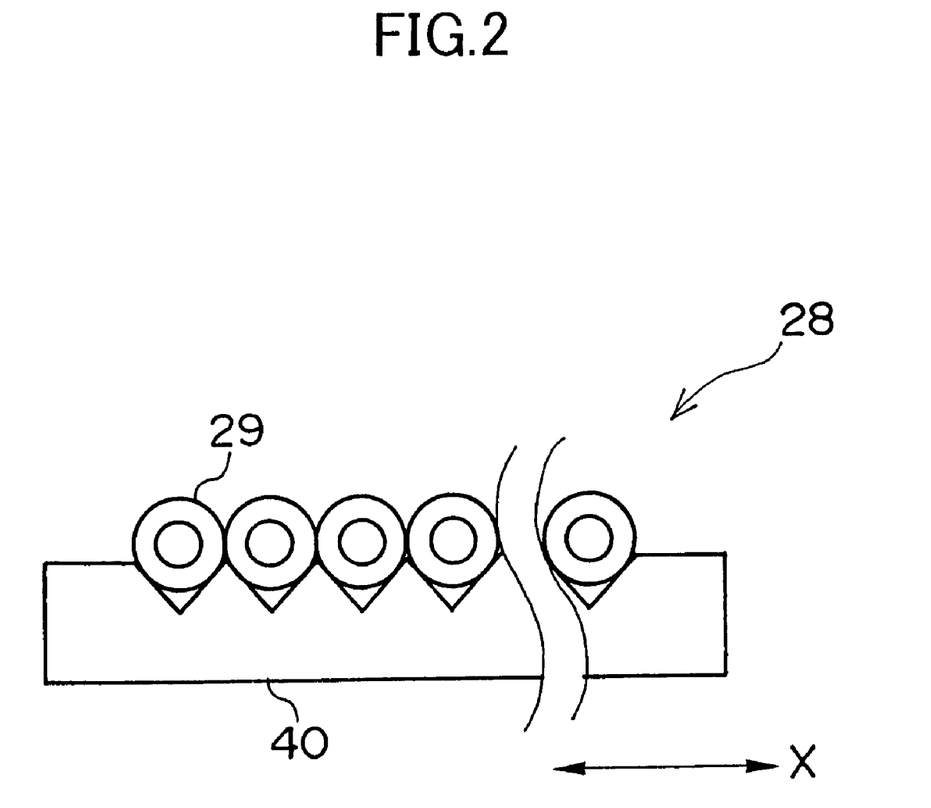
FIG. 2 is a schematic sectional diagram of an optical fiber array.

FIG. 2 is a schematic sectional diagram of a light-emitting side of the optical fiber array 28. As shown in FIG. 2, the optical fiber array 28 is structured with a plurality of optical fibers 29 fitted into corresponding V-shaped grooves provided on the base 40. The optical fibers 29 are arranged along a sub-scanning direction X. The optical fibers 29 guide laser beams directed from unillustrated semiconductor laser diodes. Accordingly, a plurality, along the sub-scanning direction X, of laser beams are emitted from the optical fiber array 28.

Figure 3:
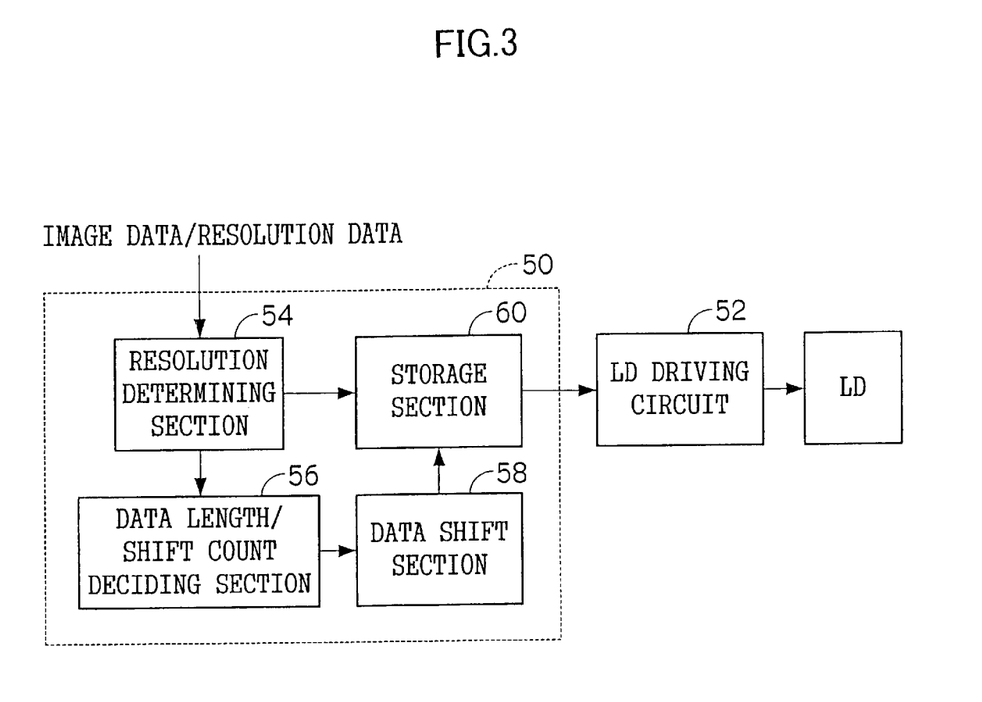
FIG. 3 is a schematic block diagram of a control system of the image forming device of the present embodiment.

Next, a structure of a control system of the image forming device relating to the present embodiment will be explained with reference to FIG. 3. As shown in FIG. 3, this control system is structured with a control circuit 50 and a laser diode-driving circuit 52. The control circuit 50 is connected to the laser diode-driving circuit 52, and the laser diode-driving circuit 52 is connected to the semiconductor laser diodes.

The control circuit 50 is structured with a resolution-determining section 54, a data length/shift count-deciding section 56, a data shift section 58 and a storage section 60. The resolution-determining section 54 compares a resolution represented by inputted resolution data with a pre-set resolution. The data length/shift count-deciding section 56 sets data length of image data to be exposed as a single line, and sets a number of shifts, on the basis of the inputted resolution data. The data shift section 58 shifts the image data based on the determined data lengths and number of shifts. The storage section 60 stores image data for which shifting has been completed. Image data and resolution data are inputted at the resolution-determining section 54. The resolution-determining section 54 is connected with the data length/shift count-deciding section 56 and the storage section 60. The data length/shift count-deciding section 56 is connected with the data shift section 58, and the data shift section 58 is connected with the storage section 60.

Next, operation of the image forming device relating to the present embodiment will be described.

Figure 4:
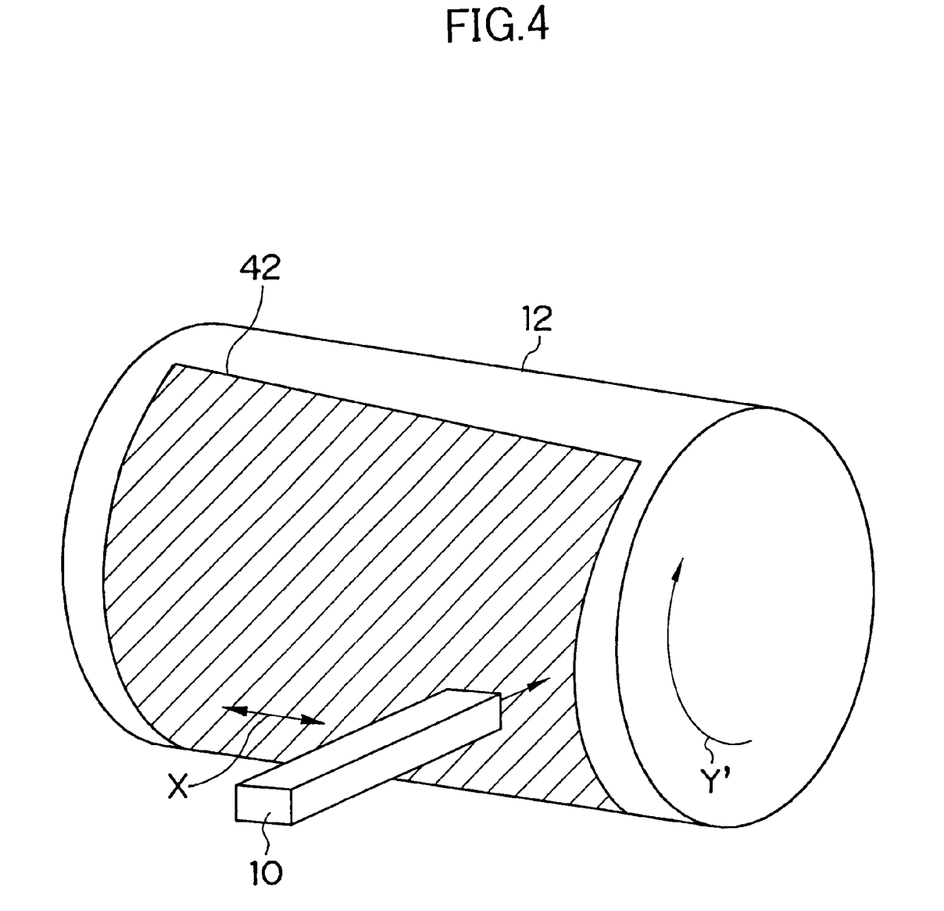
FIG. 4 is a schematic disposition diagram of a drum, an exposure section and a recording material.

As shown in FIG. 4, a recording material 42 is wound at the drum 12 of the image forming device relating to the present embodiment, inclined at an angle corresponding to a predetermined resolution P0. That is, the inclination is specified such that undistorted images are formed without compensation when the resolution is P0. The recording material 42 wrapped onto the drum 12 may be held at a front end portion and a rear end portion of the recording material 42 by unillustrated chuck or respective chucks, disposed substantially in the axial direction of the peripheral surface portion of the drum 12. Also, the interior of the drum 12 may be a cavity, with a plurality of small holes being provided connecting the peripheral surface of the drum 12 with the cavity. The recording material may be suction-adhered at the peripheral surface of the drum 12 by suction of air into the cavity.

When predetermined image data and resolution data for a resolution P1 are inputted by a user, the drum 12 rotates in a direction Y', which is the opposite direction to a main scanning direction, and the exposure section 10 moves in the sub-scanning direction X at a fixed speed such that the exposure section 10 moves by an amount equal to an image forming width in the sub-scanning direction X per each turn of the drum 12. While the exposure section 10 moves, the semiconductor laser diodes are turned on and off at predetermined timings on the basis of the image data, and an image is formed on the recording material 42.

Here, if the control circuit 50 outputs signals to the laser diode-driving circuit 52 on the basis of the inputted image data without compensation, and the semiconductor laser diodes are turned on and off on the basis of driving signals outputted from the laser diode-driving circuit 52 in accordance with the signals from the control circuit 50 to form an image, then the image will be formed in a spiral form. Consequently, the image, which should properly be formed in a rectangular shape on the recording material 42, will be distorted to a parallelogram shape, as shown in FIG. 11.

Here, if the number of the laser beams is N, the width of an image formed by the exposure section 10 for one turn of scanning will be N×25.4/P0 for a resolution of P0 and N×25.4/P1 for a resolution of P1.

Therefore, if the image is formed without compensation, distortion will occur as shown in FIG. 11, such that the image is displaced by a displacement amount S obtained from the following formula for a single turn of the drum 12. If P0>P1, the image is moved (displaced) in a direction which is the same as the sub-scanning direction (one of the directions indicated by arrow X in FIG. 4). If P0<P1, the image is moved (displaced) in a direction opposite to the sub-scanning direction.

$$S = N \times 25.4 |1/P1 - 1/P0| \text{ (mm)} \qquad \text{Formula 1}$$

Figure 5:
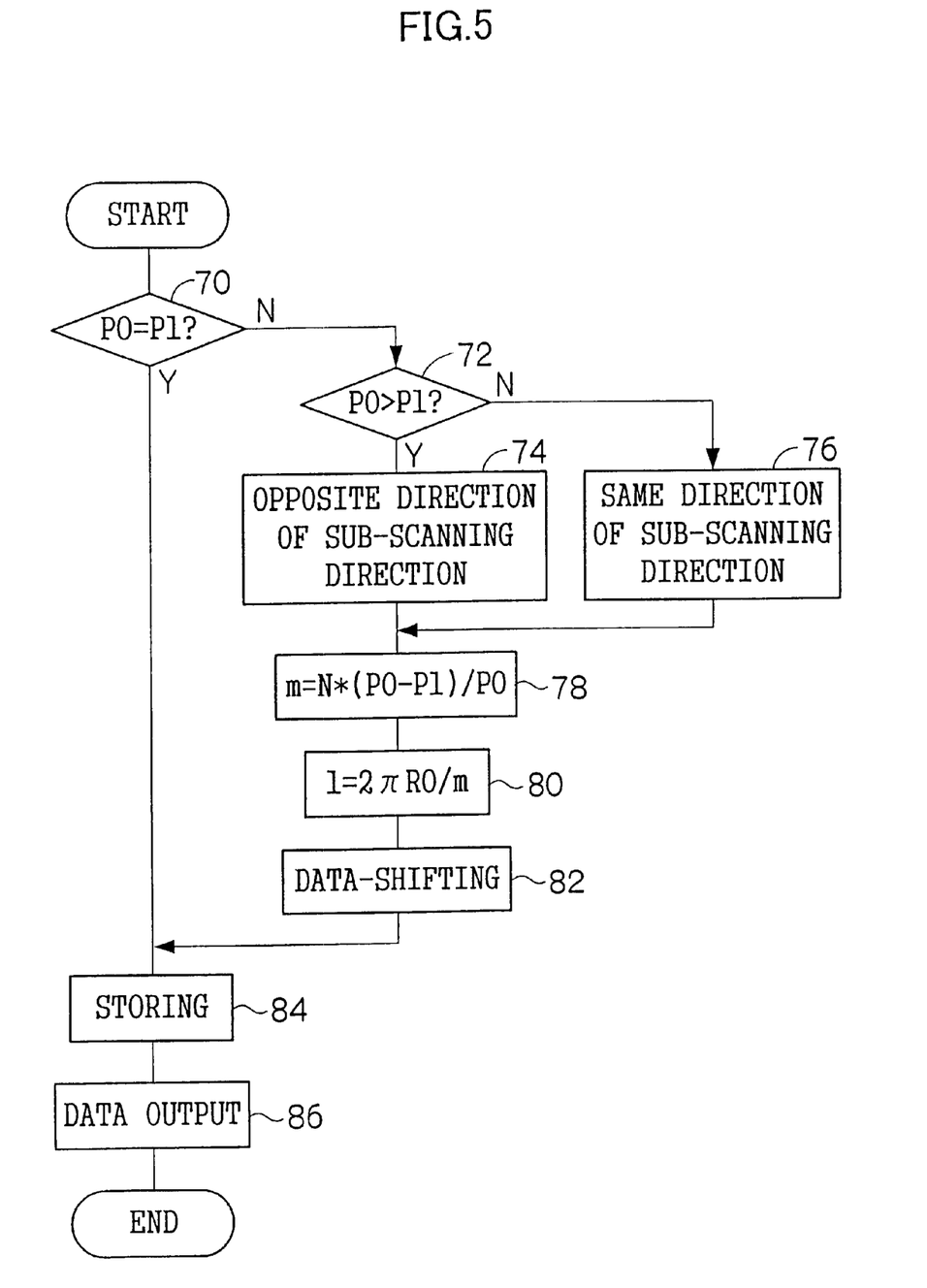
FIG. 5 is a flowchart of normalization compensation processing of a first embodiment.

Accordingly, images are formed with the control circuit 50 carrying out normalization compensation (same-size compensation), which compensates for this distortion, in accordance with the flowchart of FIG. 5.

In a step 70, the resolution-determining section 54 determines whether or not the inputted resolution P1 is the same as the pre-specified resolution P0, that is, whether or not P0=P1. If P0=P1, compensation is not required. Hence, the inputted image data is stored in the storage section 60 unaltered in step 84. If P0≠P1, in step 72, the resolution-determining section 54 determines whether or not P0>P1. If P0>P1, a direction for shifting image data is a direction opposite to a direction of advancement of the exposure section 10 along the sub-scanning direction X. Hence, this shift direction is stored at the data shift section 58 in step 74. If P0<P1, the direction for shifting image data is the same direction as the direction of advancement of the exposure section 10 along the sub-scanning direction X. Hence, this shift direction is stored at the data shift section 58 in step 76.

In step 78, the number of shifts of the image data in the sub-scanning direction is calculated at the data length/shift count-deciding section 56.

Now, the number of shifts of the image data in the sub-scanning direction will be explained. As mentioned above, when P0≠P1, an image formation position according to the exposure section 10 is displaced by a displacement amount calculated by the above formula 1 during a single turn of the drum 12, in the same direction as the exposure section 10 advancement direction along the sub-scanning direction X when P0>P1 and in the direction opposite to the exposure section 10 advancement direction along the sub-scanning direction X when P0<P1. Accordingly, each time the image data is shifted by one pixel amount, the image data is shifted in a direction opposite to the direction in which the image data has shifted from a predetermined position, and the image forming position is compensated. Thus, during one turn of the drum 12, the image data is shifted m times, and the image data is shifted by the total calculated movement (displacement) amount. Here, m can be calculated using the following formula 2.

$$m = N \times 25.4|1/P1 - 1/P0|/25.4/P1 \quad \text{Formula 2}$$
$$= N \times |P0 - P1|/P0$$

In step 80, a data length l for forming a one-line image in which image is formed by one line, in the main scanning direction is calculated at the data length/shift count-deciding section 56. If a radius of the drum 12 is R0, then the circumference of the drum 12 is 2πR0. Therefore, if the image data is shifted one pixel at a time, in the sub-scanning advancement direction or the direction opposite to the sub-scanning advancement direction, m times during one turn of the drum 12, such that data lengths in the main scanning direction are the same, then the one-line image data length l in the main scanning direction can be calculated as follows.

$$l = 2\pi R0/m \quad \text{Formula 3}$$

In step 82, data shifting is carried out at the data shift section 58 for normalization compensation, on the basis of the image data shift direction, the shift count m, and the data length l for recording the one-line images in the main scanning direction, which values have been calculated in the above-described steps, and the number of laser beams N. The data shift section 58 is provided with a shifting function for shifting the image data of each data length l by an amount corresponding to one pixel in the sub-scanning advancement direction or the direction opposite to the sub-scanning advancement direction. The above-mentioned normalization compensation is performed using this shifting function. Thus, data shifting is carried out.

In step 84, image data for which data shift processing, in order to perform normalization compensation, has been finished is stored at the storage section 60. In step 86, signals are outputted from the storage section 60 to the laser diode-driving circuit 52 based on the image data. Thus, this process is completed.

The laser diode-driving circuit 52 transmits driving signals to the semiconductor laser diodes in accordance with the signals from the storage section 60. The semiconductor laser diodes turn on and off in accordance with the driving signals. Consequently, the image is formed at the recording material 42.

Figure 6A:
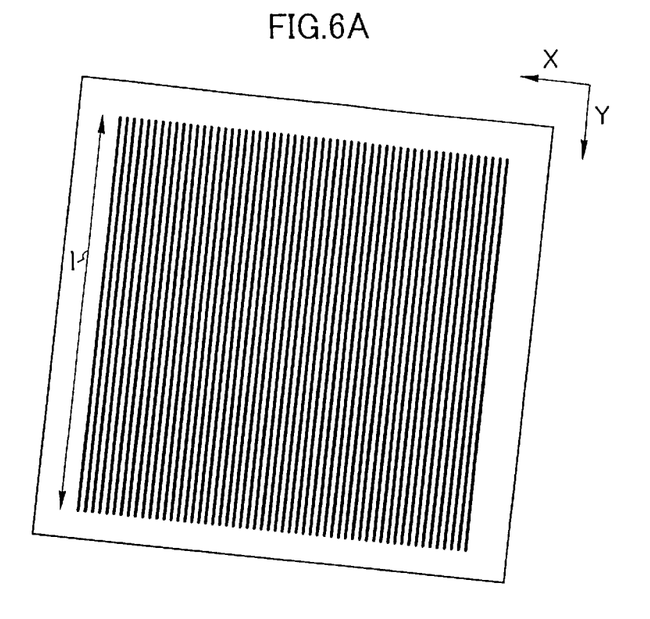
FIG. 6A is an image formation example when an image is formed at a resolution P0 in accordance with the normalization compensation processing flowchart of the first embodiment.
Figure 6B:
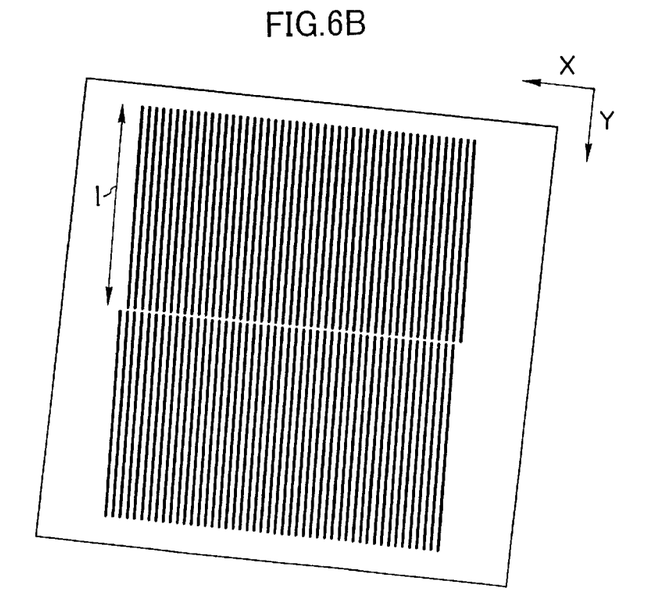
FIG. 6B is an image formation example when an image is formed at a resolution P1 in accordance with the normalization compensation processing flowchart of the first embodiment.

FIGS. 6A and 6B show examples of image formation in accordance with the above-described flowchart. FIG. 6A is an image formation example for a resolution of P0. FIG. 6B is an image formation example for a resolution of P1 (P0<P1).

Figure 7A:
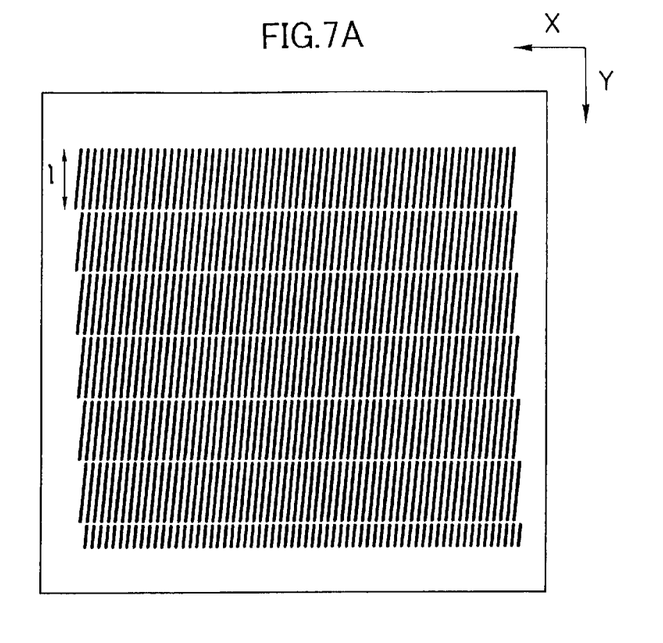
FIG. 7A is an image formation example when an image is formed with normalization compensation being performed only by data shifting, at a resolution P1=P0.
Figure 7B:
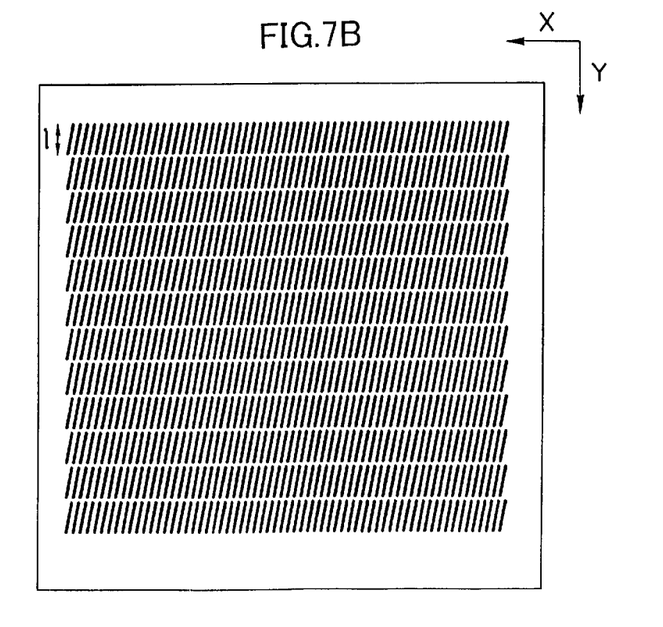
FIG. 7B is an image formation example when an image is formed with normalization compensation being performed only by data shifting, at a resolution P1>P0.

FIGS. 7A and 7B show image formation examples whose images are formed with normalization compensation being implemented only by data shifting and the recording material 42 being wrapped at the drum 12 without inclination. FIG. 7A is an image formation example for a resolution of P0. FIG. 7B is an image formation example for a resolution of P1 (P0<P1).

As can clearly be seen by comparison of the image formation examples shown in FIGS. 6A, 6B, 7A and 7B, when normalization compensation is carried out by inclining the recording material in accordance with the predetermined resolution and wrapping the material in this inclined state on the drum in advance and then data shifting, as in the present embodiment, the number of data shifts in the same direction as the exposure section 10 sub-scanning advancement direction or the direction opposite to the exposure section 10 sub-scanning advancement direction can be made smaller than in a case of carrying out normalization compensation by data shifting alone. Consequently, a number of divisions in the main scanning direction becomes smaller and a high quality image with fewer linear flaws can be formed. Moreover, because the number of data shifts is smaller, the burden on each of various circuits is alleviated.

Furthermore, if compensation is carried out only by inclining the recording material and then winding the material in the inclined state at the drum in advance, the resolution will be fixed and cannot be changed. However, because compensation is carried out also by data shifting in the present embodiment, compensation can be carried out in accordance with a change in resolution.

Second Embodiment

Next, a second embodiment will be explained. Parts that are the same as in the first embodiment are given the same reference numbers and will not be explained in detail.

The structure of an image forming device of the present embodiment is the same as in the first embodiment. Therefore, detailed explanations of the structure are omitted.

In the present embodiment, the angle at which the recording material 42 is wrapped onto the drum 12 in an inclined manner is set to correspond to the minimum resolution that can be set at the image forming device.

Next, the reason why the inclination at which the recording material 42 is wrapped onto the drum 12 is set to correspond to the minimum specifiable resolution of the image forming device will be explained.

Figure 8A:
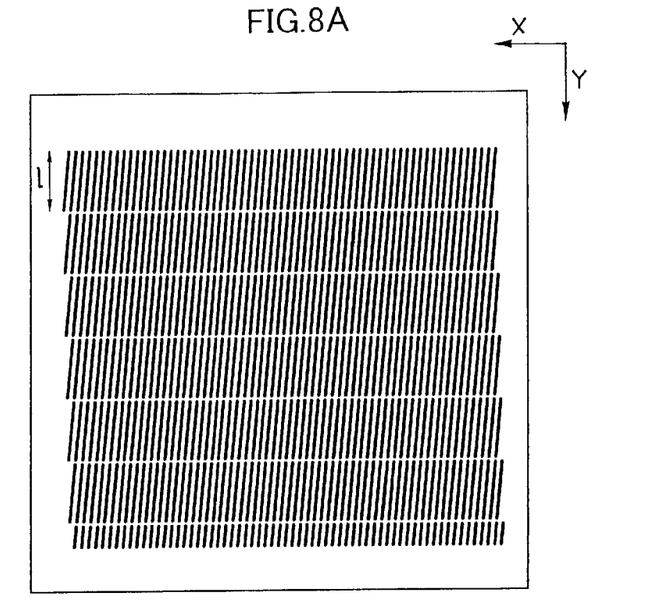
FIG. 8A is an image formation example when an image is formed with normalization compensation being performed only by data shifting, at a resolution P0.
Figure 8B:
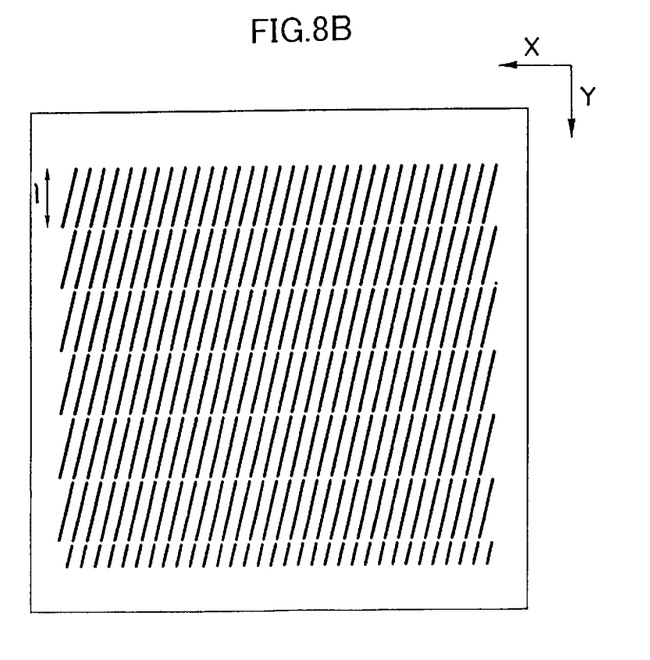
FIG. 8B is an image formation example when an image is formed with normalization compensation being performed only by data shifting, at a resolution P0/2.

For example, FIGS. 8A and 8B show image formation examples for which compensation is carried out only by data shifting in the embodiment described above, for a resolution P0 and a resolution P0/2, with a minimum resolution being P0/2. When images are formed at the resolution P0 and the resolution P0/2 using the same number of laser beams, a distance shifted in the same direction or opposite direction of the sub-scanning advancement direction of the exposure section 10 during one rotation of the drum 12 for the resolution P0/2 is twice as large as that for the resolution P0. Therefore, because a pixel interval at the resolution P0/2 is twice as large as a pixel interval at the resolution P0, steps formed by performing data shifting one pixel at a time in the sub-scanning direction for the resolution P0/2 are twice as large as that for the resolution P0. Consequently, as can be clearly seen by comparing FIGS. 8A and 8B, the steps formed in the main scanning direction in the image of FIG. 8B are twice as deep as in the image of FIG. 8A. Therefore, the steps in FIG. 8B are more obvious, and linear flaws over the whole of the image are more obvious. Thus, the image quality is worse.

Conversely, in the image of FIG. 8A, the steps have a depth half the depth of the steps in the image of FIG. 8B. Thus, linear flaws are not obvious and a higher quality image is formed than in FIG. 8B.

Therefore, if the inclination of the recording material 42 wound on the drum 12 is set in accordance with the lowest resolution that can be output at the image forming device and normalization compensation is performed such that the number of data shifts increases as the resolution becomes higher, then the number of data shifts can be made smaller for image formation at lower resolutions. As a result, the problem described above can be avoided.

Figure 9:
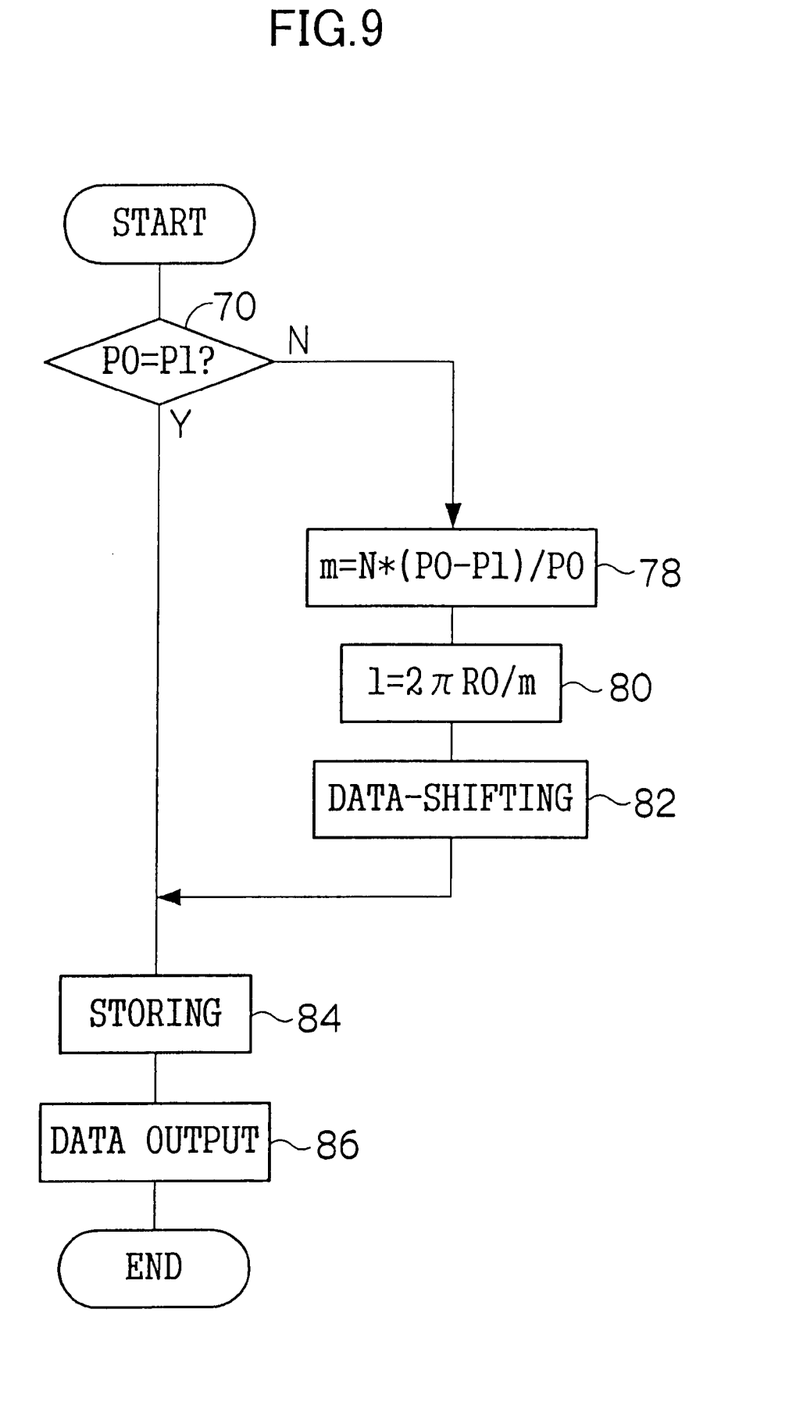
FIG. 9 is a flowchart of normalization compensation processing of a second embodiment.

Next, an image forming procedure of the image forming device relating to the present embodiment will be explained in accordance with the flowchart of FIG. 9. The relationship of resolutions P0 and P1 is P0≠P1. P1 is a resolution inputted by a user, and P0 is the minimum resolution.

In step 70, the resolution-determining section 54 determines whether or not the inputted resolution P1 is equal to the resolution P0, that is, whether or not P0=P1. If P0=P1, compensation is not necessary and, in step 84, the inputted image data is stored at the storage section 60 unaltered. If P0≠P1, in step 78 the data length/shift count-deciding section 56 calculates the number of image data shifts in the sub-scanning direction with a method same as in the first embodiment. Then, in step 80, the data length/shift count-deciding section 56 calculates the data length l for forming the one-line images in the main scanning direction with a method the same as in the first embodiment.

In step 82, data shifting in a direction the same as the exposure section 10 sub-scanning advancement direction is carried out at the data shift section 58 for normalization compensation, on the basis of the shift count m and the one-line image-recording data length l in the main scanning direction, which have been calculated in the above steps, and the number of laser beams N. In step 84, image data for which data shift processing, in order to perform normalization compensation, has been finished is stored at the storage section 60. In step 86, signals are outputted from the storage section 60 to the laser diode-driving circuit 52 based on the image data. Thus, this process is completed.

Figure 10A:
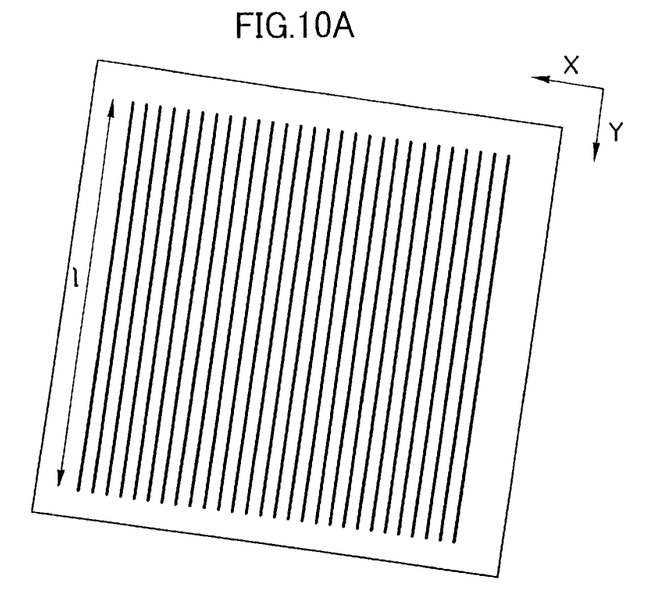
FIG. 10A is an image formation example when an image is formed at a resolution P0 in accordance with the normalization compensation processing flowchart of the second embodiment.
Figure 10B:
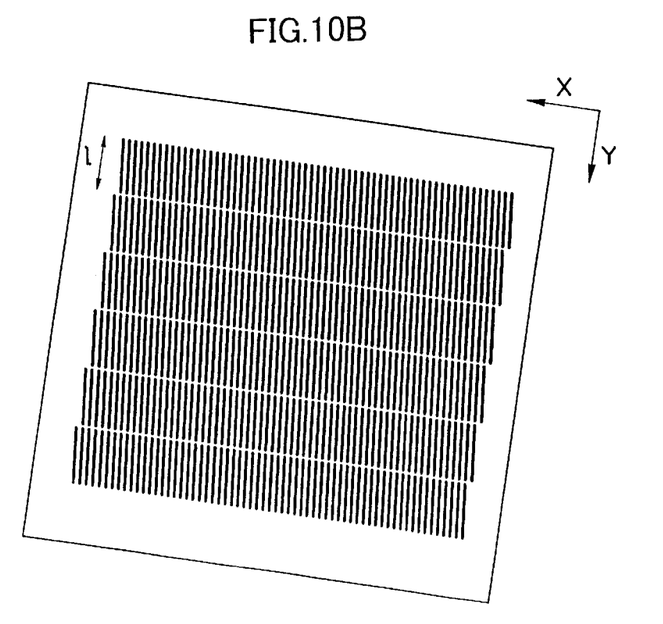
FIG. 10B is an image formation example when an image is formed at a resolution P1 in accordance with the normalization compensation processing flowchart of the second embodiment.

The images formed by the present embodiment are shown in FIGS. 10A and 10B. FIG. 10A is an image formation example in which the resolution P1=P0. FIG. 10B is an image formation example in which the resolution P1>P0. According to the present embodiment, the inclination of the recording material 42 wrapped on at the drum 12 is set to correspond to the minimum resolution that can be outputted by the image forming device, and normalization compensation is performed so that the number of data shifts increases as the resolution gets higher. Accordingly, the number of data shifts can be made small during image formation at lower resolutions, and a deterioration of image quality when forming images at lower resolutions can be alleviated.

It should be noted that, although compensation is implemented by data-shifting single pixel amounts in the sub-scanning direction in the first and second embodiments, the present invention is not limited to this. Compensation may be implemented by data-shifting multiple pixel amounts in the sub-scanning direction. If data is shifted by multiple pixel amounts in the sub-scanning direction, the number of data shifts can be made smaller, and loading on the various types of circuit can be alleviated.

In the first and second embodiments described above, the recording material is slantedly wound such that, when recording at a predetermined resolution, the recorded main scanning lines are parallel with both ends of the recording material along a direction of winding onto the drum. For each occasion on which the main scanning lines being recorded on the recording material are displaced in the sub-scanning direction, relative to the main scanning lines recorded at the predetermined resolution, by precisely an amount corresponding to a beforehand predetermined number of pixels, image data corresponding to the predetermined number of pixels is shifted in a direction opposite to the direction of displacement. Consequently, because the image is formed with the recording material being wound onto the rotary drum at an angle and the image data corresponding to the predetermined number of pixels being shifted in the direction opposite to the direction of displacement whenever the main scanning lines being recorded on the recording material are displaced in the sub-scanning direction relative to the main scanning lines recorded at the predetermined resolution by precisely the amount corresponding to the beforehand predetermined number of pixels, the number of times the data is shifted can be made smaller than in a case in which the recording material is wound on the drum non-inclinedly and the data compensated by shifting, and higher quality images can be formed. Further, because the number of times the data is shifted can be made smaller, loads on the device can be alleviated. Furthermore, by comparison with a case in which a recording material is wound on a rotary drum without inclination and compensation is carried out by data-shifting, the number of data shifts can be made smaller. Therefore, better quality images can be formed. Also, because the number of data shifts can be made smaller, an effect that burdens on the device are alleviated is obtained.

Moreover, although a resolution for which compensation is possible simply by wrapping a recording material at an inclination corresponding to a predetermined resolution is fixed, because compensation is also carried out by data-shifting, compensation in accordance with changes in resolution is possible.

Furthermore, in the first and second embodiments of the present invention, by setting the predetermined resolution to the minimum specifiable resolution, and winding the recording material onto the rotary drum at an angle in accordance with this minimum resolution, the number of data shifts at low resolutions, at which the steps are more discernible, can be reduced. At higher resolutions, the steps are less discernible. Compensation is performed with the number of data shifts increasing as resolution gets higher. Consequently, images of higher image quality can be formed.

What is claimed is:

1. An image forming device for forming an image in accordance with an inputted resolution by irradiating a recording material, the image forming device comprising:

a rotary drum including a peripheral surface, the rotary drum rotating in a main scanning direction in a state in which the recording material is wound onto the peripheral surface;

a recording head disposed at a portion facing the peripheral surface of the rotary drum, the recording head being moveable in an axial direction of the rotary drum, which is a sub-scanning direction, the recording head being capable of irradiating with a plurality of light beams which are separated by predetermined intervals in the sub-scanning direction, and the recording head irradiating the recording material with the light beams on the basis of image data while the rotary drum is rotating; and an image data-shifting section which shifts image data, wherein the recording material is wound onto the rotary drum in an incline manner such that, in a case of recording at a predetermined resolution, a main scanning line to be recorded is parallel to an end portion of the recording material which is along a direction of winding onto the rotary drum, and in a case of recording at the inputted resolution other than the predetermined resolution, the image data-shifting section, at each occurrence of displacement of a main scanning line being recorded at the recording material, relative to a main scanning line recorded at the predetermined resolution, by a predetermined pixel amount determined in advance, shifts image data by the predetermined pixel amount in a direction opposite to the direction of the displacement.

2. The image forming device of claim 1, wherein the displacement by the predetermined pixel amount is determined by recording of a one-line length in the main scanning direction, the one-line length being calculated on the basis of the predetermined resolution, the inputted resolution, the number of the light beams, and a circumferential length of the rotary drum.

3. The image forming device of claim 1, wherein the predetermined resolution is the lowest resolution that can be set at the image forming device.

4. The image forming device of claim 1, wherein a number of times of shifting of image data and a data length in the main scanning direction of the shifted image data in one main scanning are determined on the basis of the predetermined resolution, the inputted resolution, the number of the light beams, and a circumferential length of the rotary drum.

5. A method for forming an image with an image forming device in accordance with an inputted resolution by irradiating a recording material, the image forming device comprising a rotary drum including a peripheral surface, the rotary drum rotating in a main scanning direction in a state in which the recording material is wound onto the peripheral surface, and a recording head disposed at a portion facing the peripheral surface of the rotary drum, the recording head being moveable in an axial direction of the rotary drum, which is a sub-scanning direction, the recording head being capable of irradiating with a plurality of light beams which are separated by predetermined intervals in the sub-scanning direction, and the recording head irradiating the recording material with the light beams on the basis of image data while the rotary drum is rotating, the method comprising the steps of:

winding the recording material onto the rotary drum in an incline manner such that, in a case of recording at a predetermined resolution, a main scanning line to be recorded is parallel to an end portion of the recording material which is along a direction of winding onto the rotary drum, and in a case of recording at the inputted resolution other than the predetermined resolution, at each occurrence of displacement of a main scanning line being recorded at the recording material, relative to a main scanning line recorded at the predetermined resolution, by a predetermined pixel amount determined in advance, shifting image data by the predetermined pixel amount in a direction opposite to the direction of the displacement.

6. The method of forming an image of claim 5, wherein the displacement by the predetermined pixel amount is determined by recording of a one-line length in the main scanning direction, the one-line length being calculated on the basis of the predetermined resolution, the inputted resolution, the number of the light beams, and a circumferential length of the rotary drum.

7. The method of forming an image of claim 5, wherein the predetermined resolution is the lowest resolution that can be set at the image forming device.

8. The method of forming an image of claim 5, wherein a number of times of shifting of image data and a data length in the main scanning direction of the shifted image data in one main scanning are determined on the basis of the predetermined resolution, the inputted resolution, the number of the light beams, and a circumferential length of the rotary drum.

* * * * *